United States Patent
Demit et al.

(10) Patent No.: US 6,851,166 B1
(45) Date of Patent: Feb. 8, 2005

(54) MEANS FOR HOLDING TWO PIECES IN POSITION IN RELATION TO EACH OTHER

(75) Inventors: Daniel Demit, Courbevoie (FR); Patrick Guillomet, Meudon (FR)

(73) Assignee: ABB Body In White, Beauchamp (FR)

( * ) Notice: Subject to any disclaimer, the term of this patent is extended or adjusted under 35 U.S.C. 154(b) by 124 days.

(21) Appl. No.: 10/089,731

(22) PCT Filed: Oct. 5, 2000

(86) PCT No.: PCT/FR00/02765

§ 371 (c)(1),
(2), (4) Date: Apr. 4, 2002

(87) PCT Pub. No.: WO01/26953

PCT Pub. Date: Apr. 19, 2001

(30) Foreign Application Priority Data

Oct. 11, 1999 (FR) ............................................. 99 12620

(51) Int. Cl.[7] ............................................. B25B 27/14
(52) U.S. Cl. ................................................. 29/281.5
(58) Field of Search ............................ 29/281.1, 897.2, 29/466, 559, 281.6, 791, 795, 787, 783, 281.5; 269/289 R, 303, 305, 559; 219/86.1, 86.24, 158; 228/49.1, 49.6

(56) References Cited

U.S. PATENT DOCUMENTS

| | | | |
|---|---|---|---|
| 5,902,496 A | * 5/1999 | Alborante | 219/86.24 |
| 6,008,471 A | * 12/1999 | Alborante | 219/158 |
| 6,340,107 B1 | * 1/2002 | Cappa et al. | 228/4.1 |
| 6,389,698 B1 | * 5/2002 | Malatier | 29/897.2 |
| 6,575,444 B1 | * 6/2003 | Bidaud | 269/91 |

FOREIGN PATENT DOCUMENTS

| | | |
|---|---|---|
| EP | 0 226 212 | 6/1987 |
| EP | 0 351 377 | 1/1990 |
| GB | 1 445 394 | 8/1976 |

* cited by examiner

Primary Examiner—Lee D Wilson
(74) Attorney, Agent, or Firm—Young & Thompson

(57) ABSTRACT

The invention provides a mechanism for holding two pieces in position that are to be moved towards each other along at least two extreme coplanar docking directions that form a docking angle between them, the holding mechanism comprises firstly at least a male and a female V (19, 20) each provided with a mechanism for fixing to a respective one of the pieces so that each V is centered substantially on a direction parallel to the bisector of the docking angle and the female V possessing an inlet portion having an aperture angle not less than the docking angle, and secondly a mechanism (23, 24) for pressing the male V against the female V along said bisector. The invention also provides apparatus for assembling pieces of bodywork and incorporating the mechanisms.

10 Claims, 6 Drawing Sheets

FIG_1

FIG_5

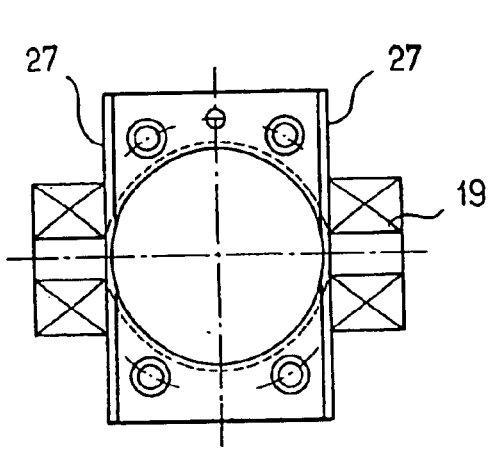
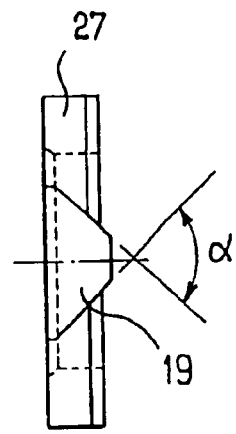
FIG.6  FIG.7
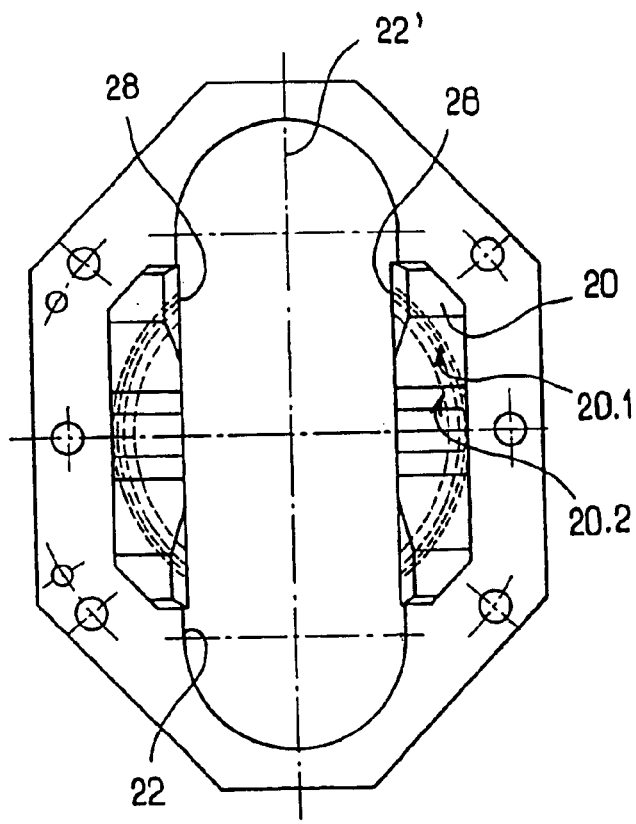
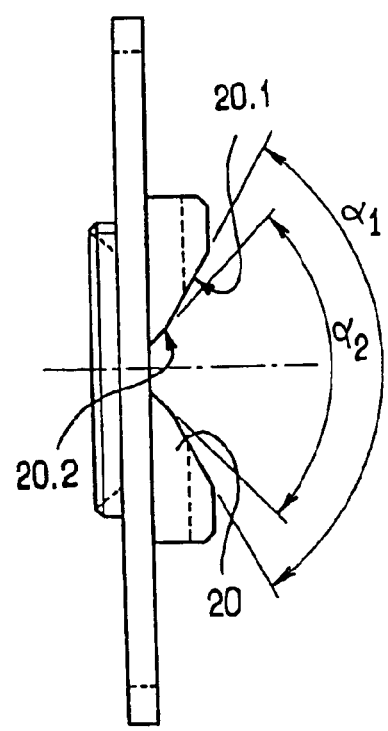
FIG.8  FIG.9

MEANS FOR HOLDING TWO PIECES IN POSITION IN RELATION TO EACH OTHER

The present invention relates to means for holding two pieces in position for fixing them together. Such position-holding means can be used, for example, to interlock two tools, or a tool and a tool support.

BACKGROUND OF THE INVENTION

In assembly lines for motor vehicle bodywork, subassemblies (such as the subframe, the sides of the body, the rear panel, . . . ) are put into position relative to one another and relative to welding robots. Since bodywork pieces are naturally deformable when subjected to stresses, the tooling used for making bodywork of determined and reproducible shape performs two functions: firstly it constitutes reinforcement for each of the deformable subassemblies so as to stiffen them, and secondly it constitutes a stable interface providing accurate positioning in a fixed frame of reference defined relative to the welding robots.

In a recently developed method of building motor vehicle bodies, the step of assembling the bodywork includes a stage of putting two body sides and a rear panel into place and holding them in position in the frame of reference of the assembly station by means of two parallel side tools each co-operating with one of the sides of the body and by means of a transverse tool co-operating with the rear panel, the three tools being connected to one another and to the frame of reference of the assembly station in such a manner that the transverse tool is placed and held in said frame of reference in a position that is precise and locked, and in such a manner that it forms a spacing and bracing tool for the two tools that are parallel in a direction perpendicular thereto.

Depending on the type of body to be assembled, it is necessary either for the rear panel to be put into place initially so that the sides of the body can then come up on either side thereof, or else for the sides of the body to be put into place initially so that the rear panel can then be fitted over the corresponding ends thereof. In addition, in order to increase productivity, it can be advantageous for the three tools to be capable of engaging or disengaging mutually relative to one another simultaneously so as to save time. Unfortunately, known means for holding two pieces in position relative to each other allow for only one direction in which said pieces can be engaged relative to each other such that incorporating such means in the above-described assembly station for interconnecting the tools would require the tools to be put into place successively at least to some extent and in a predetermined order. That limits the flexibility and the maximum productivity of the method.

OBJECTS AND SUMMARY OF THE INVENTION

The invention proposes means that are simple for holding two pieces in position while enabling the pieces to be brought towards each other in at least two extreme coplanar docking directions that form a docking angle between them.

According to the invention, the position-holding means comprises firstly at least a male and a female V each provided with means for fixing to a respective one of the pieces so that each V is centered substantially on a direction parallel to the bisector of the docking angle, the female V possessing an inlet portion having an aperture angle not less than the docking angle, and secondly means for pressing the male V against the female V along said bisector.

Thus, each V provides a function of guiding and/or recentering the other V during the stage in which the two pieces are approaching each other, thus enabling the axes of the Vs to be brought into alignment, and a function of statically positioning the other V once the pieces have approached each other and are held in position by the means pressing the Vs against each other.

According to a first particular characteristic, the Vs have aperture angles that are substantially equal and greater than the docking about and, more particularly, for a docking angle of about 90°, the aperture angles of the Vs are equal to about 120°. Since the aperture angle of the Vs is greater than the docking angle, uncertainties in the relative positioning of the Vs prior to coming into contact are of no consequence. This is particularly advantageous when the pieces are put into place by standard robots of medium positioning accuracy.

According to a second particular characteristic, the female V possesses an end portion having an aperture angle substantially equal to the aperture angle of the male V which is not less than the docking angle, and the aperture angle of the inlet portion of the female V is greater than the aperture angle of the end portion thereof and, more particularly, for a docking angle substantially equal to 90°, the aperture angle of the male V and of the end portion of the female V is substantially equal to 90°, and the aperture angle of the inlet portion of the female V is substantially equal to 120°.

In a particular embodiment, the means for pressing the Vs together comprise a peg projecting from the male V symmetrically relative thereto so as to be inserted into an elongate slot formed in the female V and having a major axis contained in the plane of the docking direction, at least one jaw being movably mounted on the peg to be actuated between an active position in which it forms an abutment for a rear face of the female V facing away from the male V, and an inactive position in which it is retracted and allows the peg to pass freely through the slot of the female V. The structure of the position-holding means is thus compact and relatively simple.

The present invention also provides apparatus for assembling bodywork, the apparatus comprising two side tools for supporting the body sides, a tool extending transversely relative to said two side tools, and means presenting one of the above-specified characteristics for holding the side tools and the transverse tool in position relative to one another, the transverse tool having at least two Vs disposed symmetrically about a longitudinal axis of the bodywork and designed to co-operate with corresponding Vs fixed to the side tools.

BRIEF DESCRIPTION OF THE DRAWINGS

Other characteristics and advantages of the invention will appear on reading the following description of particular, non-limiting embodiments of the invention.

Reference is made to the accompanying drawings, in which:

FIGS. 6 and 7 are a face view and a side view of a variant embodiment of the male V of the apparatus of the invention; and FIGS. 8 and 9 are views analogous to FIGS. 6 and 7 showing the corresponding variant embodiment of the female V.

DETAILED DESCRIPTION OF THE INVENTION

The apparatus of the invention is for use in assembling vehicle bodywork comprising a subframe 1 of the vehicle body, two body sides 2, and a rear panel 3.

Figure 1:
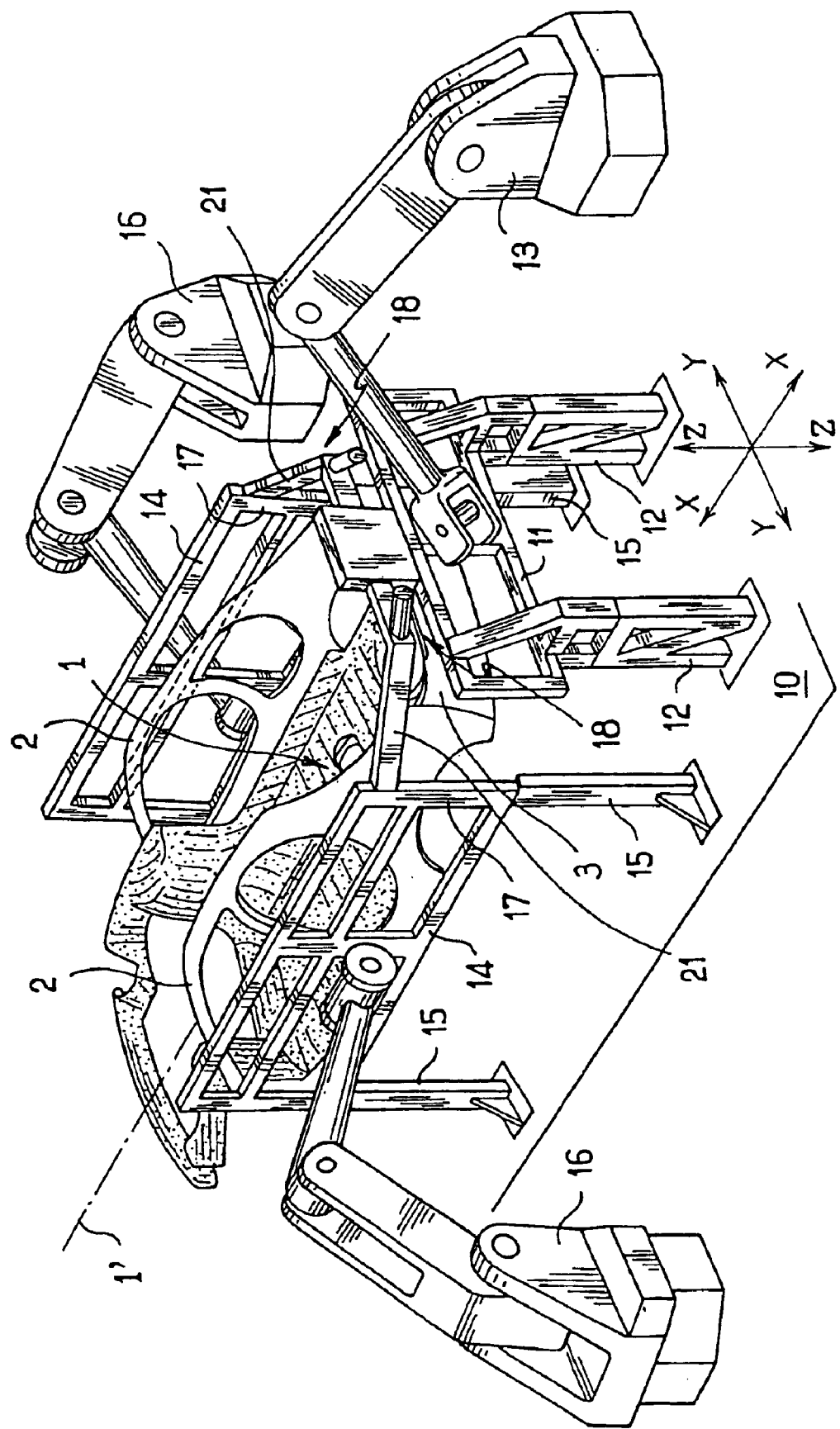
FIG. 1 is a diagrammatic perspective view of apparatus in accordance with the invention for assembling vehicle bodywork.

With reference to FIG. 1, the assembly apparatus comprises a fixed structure 10 possessing an X, Y, Z frame of reference. A support for the subframe 1 of the motor vehicle body can be brought into this structure in such a manner that the longitudinal axis 1' of the subframe 1 is parallel to the X direction. The means for bringing this support into the structure and putting it into position in the frame of reference are known in themselves and they are not shown. By way of example, the support can be constituted by a pallet which travels on a conveyor passing through the structure 10 along the X direction, with lifting means being provided in the structure to separate the pallet from the conveyor and put it into a reference position in the X, Y, Z frame.

The assembly apparatus comprises a transverse tool for co-operating with the panel 3 and two side tools for co-operating with the body sides 2.

The transverse tool is symbolized as a frame 11 extending transversely to the direction X and suitable for being coupled to the structure 10 via support studs 12, for example. In this case, the studs 12 co-operate with the frame 11 via four fixing points which enable the frame 11 to be held completely stationary in the structure 10 both in translation relative to the directions X, Y, and Z and in rotation about them. In this case, the frame 11 is fitted on one of its faces with gripping and handling means for use by a robot 13 handling the frame. On its other face, the frame 11 possesses clamps for co-operating with the panel 3.

The side tools are symbolized as frames 14 extending parallel to the Z direction and supported by the structure 10 via studs 15 which serve to fix the positions of the frames in the Z direction. Each frame 14 is fitted on one of its faces with gripping and handling means for engaging a robot 16 that handles it, and on its other face with clamps for co-operating with the corresponding body side 2.

The rear upright 17 of each frame 14 is connected to the frame 11 via position-holding means given overall reference 18 for holding the frames 14 in a vertical position that is spaced and braced by the frame 11, and also for fixing the frames 14 in position along the X direction. In analogous manner, provision can be made for the frames 14 to constitute elements for locking the frame 11 in the X and Z directions, with the frame 11 co-operating directly with the structure 10 solely via a stud that prevents it from moving in the Y direction (e.g. by a Z-axis pilot).

Figure 2:
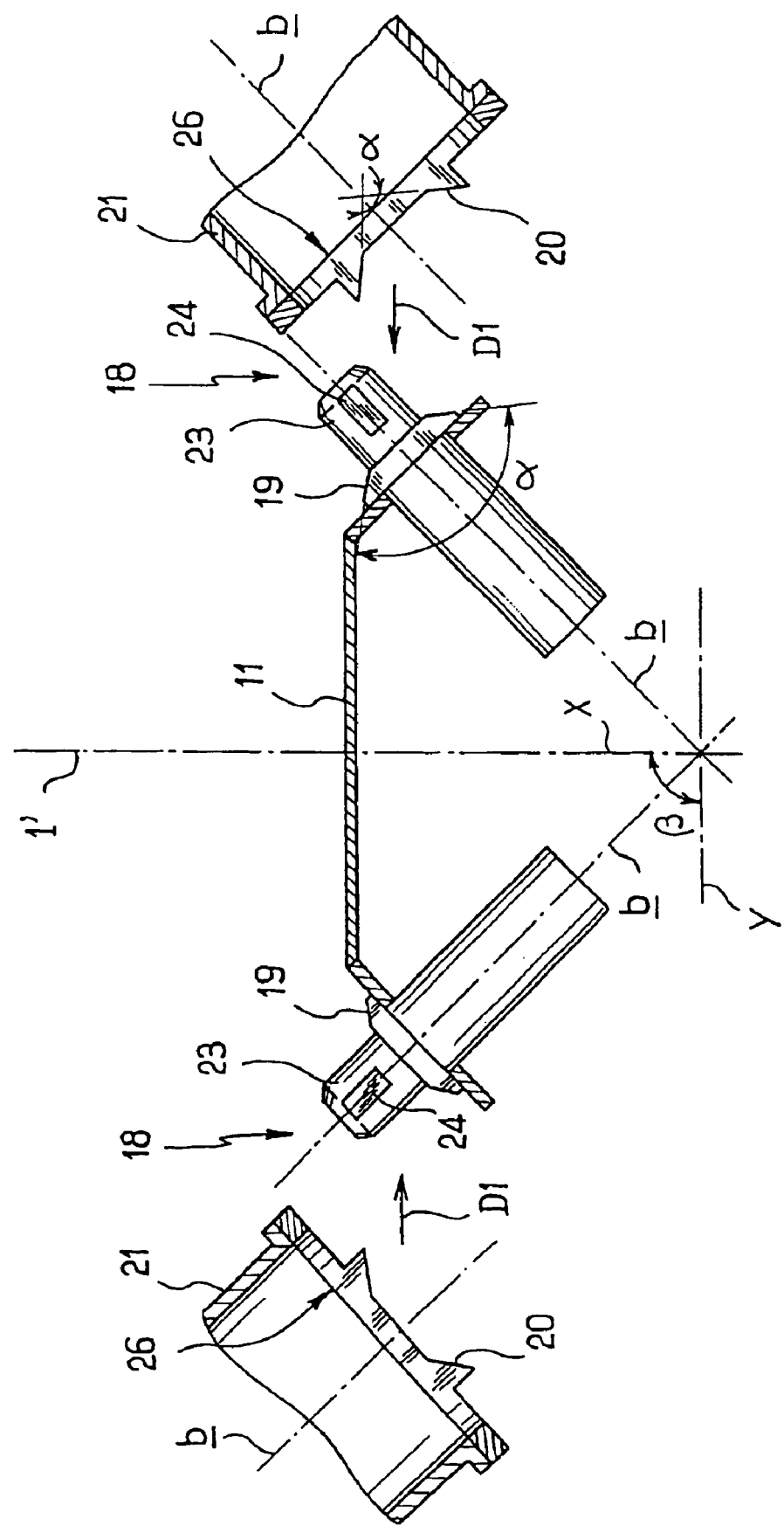
FIG. 2 is a fragmentary plan view showing a first mode of bringing together tools of the apparatus of the invention.
Figure 3:
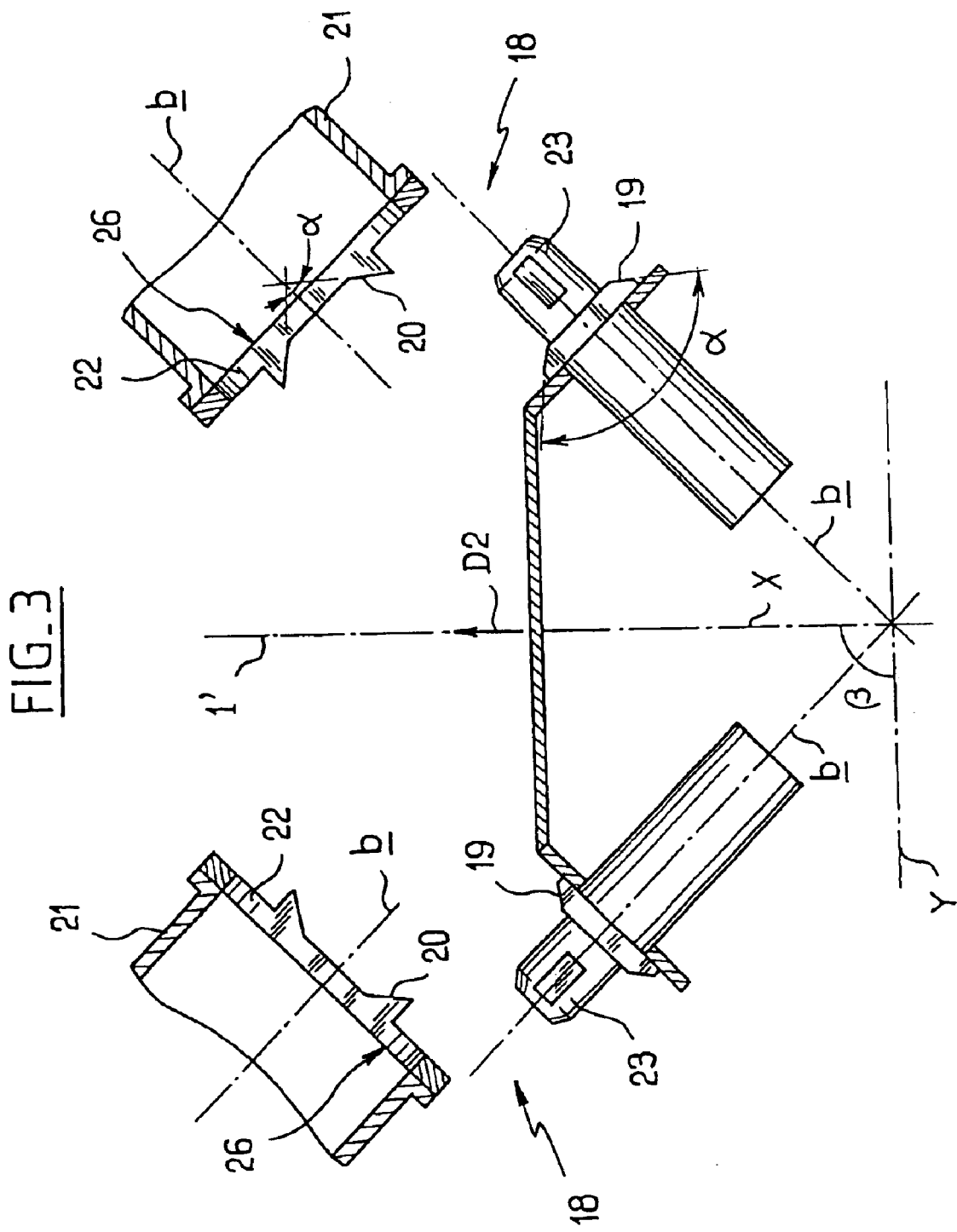
FIG. 3 is a view analogous to FIG. 2 showing a second mode of bringing the tools together.

The position-holding means 18 are arranged to enable the frame 11 to dock with each of the frames 14 in a direction D1 parallel to the Y direction and to enable the frames 14 to dock with the frame 11 in a direction D2 parallel to the X direction (see FIGS. 2 and 3). These two docking directions are coplanar and between them they form a docking angle β which in this case is equal to 90°. The position-holding means also serve to enable the tools to dock in directions that are intermediate between the extreme directions D1 and D2.

Figure 4:
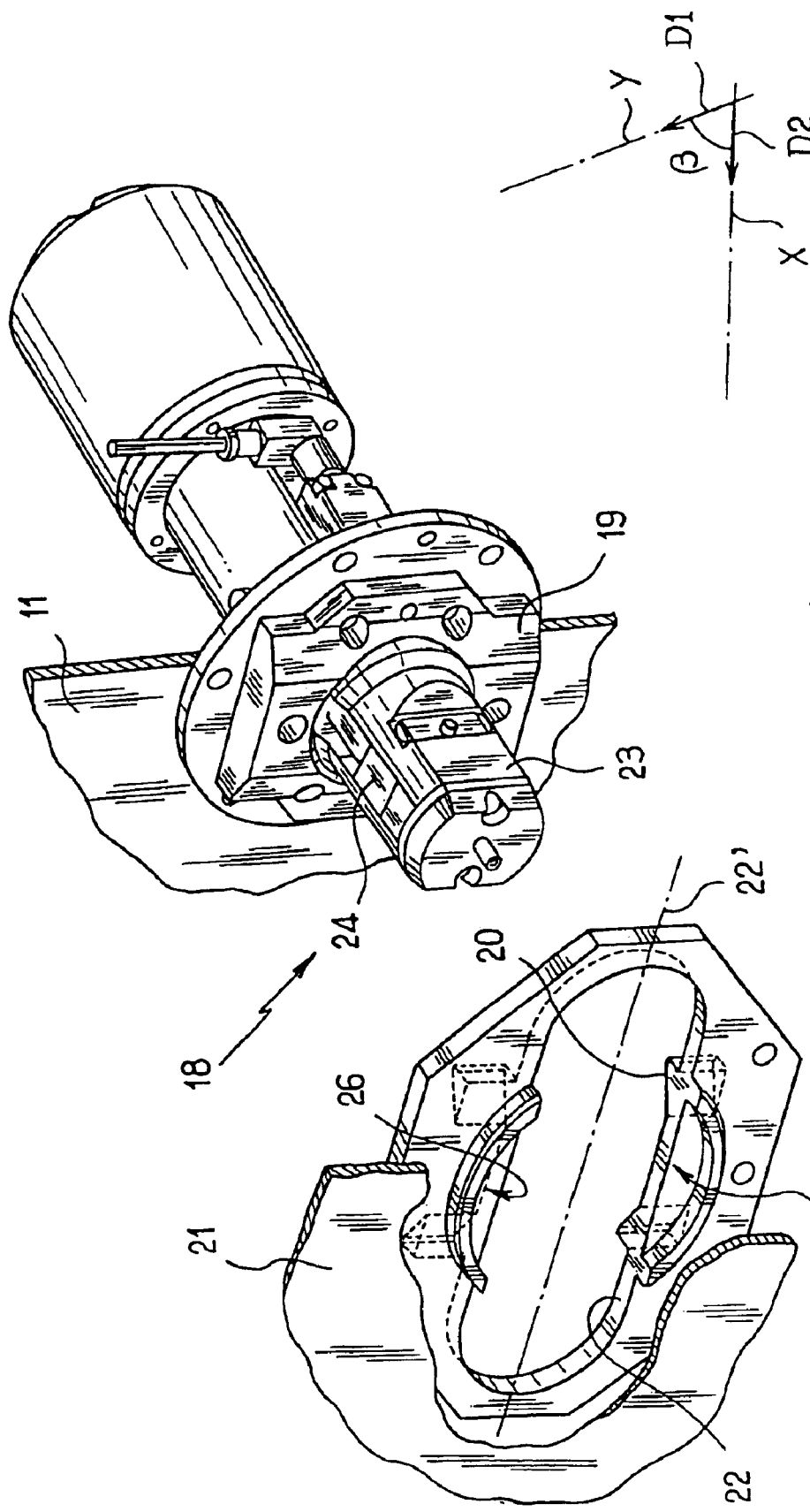
FIG. 4 is a perspective view of means for holding two tools in position, the means being shown while they are being brought together.

With reference also to FIG. 4, each position-holding means 18 comprises a male V 19 and a female V 20 having an aperture angle α of about 120°. The aperture angle α of the Vs is not less than the docking angle and is preferably greater than it.

The transverse tool is associated with two male Vs 19 disposed symmetrically about the axis 1' so that each co-operates with a respective one of the side tools. Each male V 19 is secured to the frame 11 in such a manner as to be centered on a direction parallel to the bisector of the docking angle, i.e. specifically the bisector b of the aperture angle α forms an angle of 45° with the X and Y directions and extends in a plane parallel to the plane containing said X and Y directions.

Each of the female Vs 20 is secured to one end of an arm 21, itself secured to the rear upright 17 of the corresponding frame 14 so as to form an angle of 45° relative to the X and Y directions. Like the male Vs 19, the female Vs 20 are mounted in such a manner as to be centered on a direction parallel to the bisector of the docking angle, i.e., in this case, the bisector b of the aperture angle α of a female V forms an angle of about 45° with the X and Y directions and is coplanar therewith. An elongate slot 22 having a major axis 22' contained in the plane of the docking directions is formed transversely in each female V 20.

Each position-holding means 18 also includes means for pressing the male V 19 against the female V 20 along the bisector of the docking angle β and the bisector b of the aperture angles α.

Figure 5:
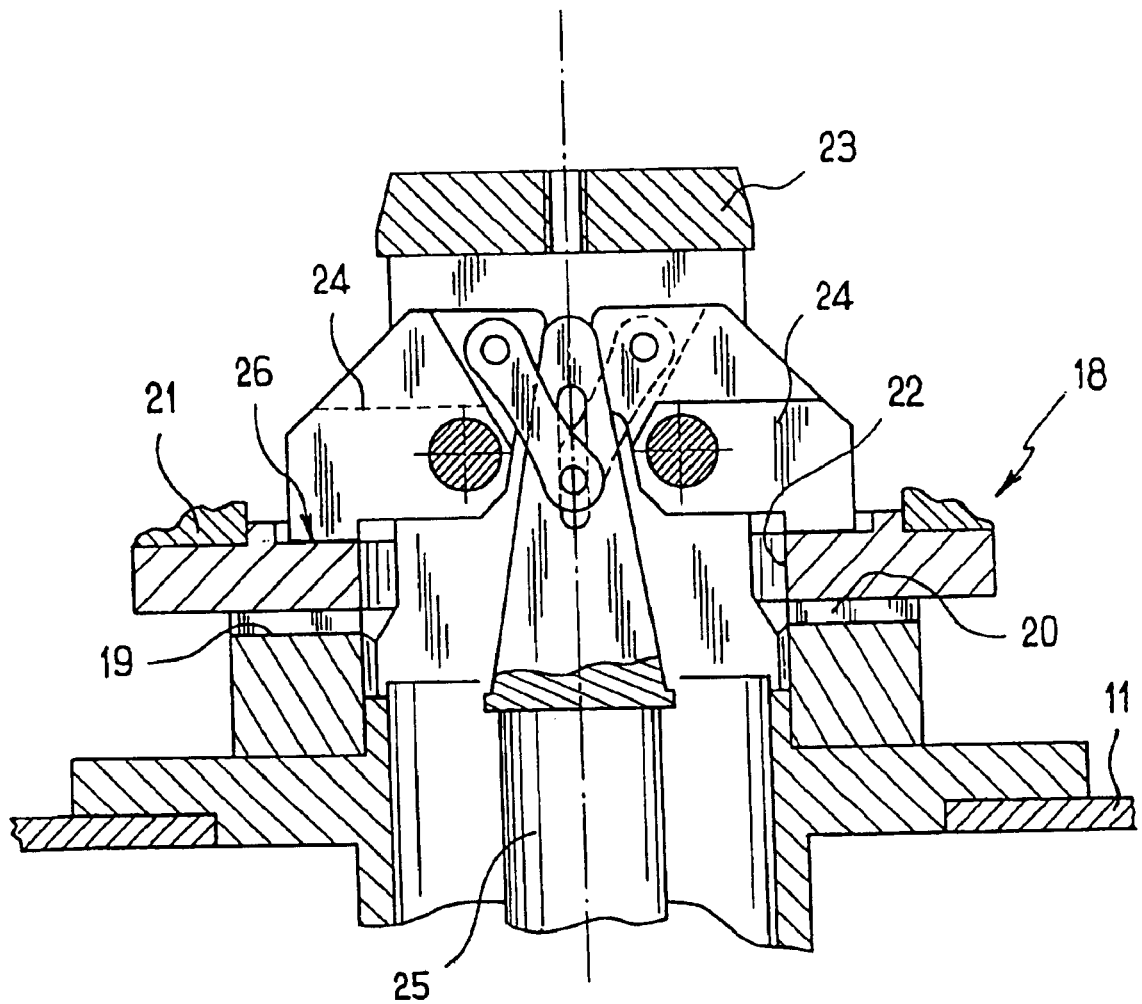
FIG. 5 is a fragmentary section through two tools held in position relative to each other.

This means comprises a peg 23 projecting from the male V 19 along the bisector b, symmetrically about the bisector, and parallel to the bisector of the docking angle. Two jaws 24 are movably mounted on the peg 23 to be actuated in conventional manner by a control rod 25 (formed by the rod of an actuator that is not shown) to move between an active position in which they project laterally from the peg 23 (FIG. 5) and an inactive position in which they are retracted into the peg 23 (FIG. 4).

In operation, the frames 11 and 14 and the corresponding bodywork elements 3 and 2 can be caused to co-operate at the time when the frames 11 and 14 are put into place in the structure 10 of the station, the panel 3, the subframe 1, and the body side 2 previously put into place in the structure of the apparatus then being preassembled. The clamps of the frames 11 and 14 can also constitute means for coupling the frame 11, 14 with the corresponding bodywork elements 3, 2 that are put into operation outside the assembly line, in which case the frame 11, 14 constitutes a kind of pallet for transporting the corresponding bodywork element 3, 2 and the robot 13, 16 serves to put the pallet into place in the apparatus.

In a first mode of docking the tools together as shown in FIG. 2 and corresponding to bodywork of a type in which the body sides 2 are brought up to the panel 3, the frame 11 is put into place in the structure 10 before the frames 14, and these frames are subsequently brought up to the frame 11 along the direction D1 parallel to the Y direction.

In a second docking mode shown in FIG. 3 and corresponding to bodywork of a type in which the panel 3 is brought up against the rear ends of the body sides 2, the frames 14 are put into place in the structure 10 before the frame 11, which frame is then brought up to the frames 14 along the direction D2 parallel to the X direction.

In a third docking mode, the frames 11 and 14 are moved towards one another simultaneously.

During the docking stage, the peg 23 of each means 18 is inserted into the slot 22 of the corresponding female V 20 and moved along the slot until the male V 19 is received in the female V 20. The jaws 24 are moved into their active positions so that they bear against the rear face 26 of the female V 20 in which the male V 19 is engaged, thereby applying traction force on the male v 19 which is pressed against the female V 20 in a direction parallel to the bisector b of the aperture angle α of the Vs (see FIG. 5), thus forming an abutment for the rear face 26. It will be observed that the aperture angle α of the Vs and the materials used for making the Vs (in this case steel) are determined in such a manner as to enable the contacting faces of each V to slide over one another during the stages of docking the Vs and pressing them one against another. The angle between the normal to these faces and the direction in which the force pressing the Vs against one another is applied is thus greater than the friction angle of the materials used for making the Vs.

The rear portions of the body sides 2 and the panel 3 are thus accurately positioned relative to the subframe 1 and this is done in a manner that is very rigid using means that are simple and lightweight.

The portions of the frames 14 remote from the uprights 17 are not prevented from moving in the Y direction. They can thus be moved towards each other by exerting a force in the Y direction on said front portions. Extensions (not shown) parallel to the Y direction and secured to the frames 14 constitute means enabling them to press against each other, thereby limiting the extent to which they can be moved towards each other and enabling them to be connected together.

Thereafter, the subframe 1, the body sides 2, and the rear panel 3 are connected together or additional connections are made between them by spot-welding using robots that are not shown. Roof panels and cross-members (not shown) can be put into place between the body sides in the same station or in a following station. This can be done merely by placing the roof structure, i.e. the roof panel and the cross-members, between the cant rails (top portions) of the body sides 2 by means of a frame-like member, and then moving the body sides towards each other and thus against the roof structure, after which welding can be performed.

In a variant shown in FIGS. 6 to 9, each female V 20 has an inlet portion 20.1 with an aperture angle α1 equal to 120° and an end portion 20.2 with an aperture angle α2 equal to the docking angle β, i.e. 90°.

Each male V 19 has an aperture angle α equal to the docking angle β and to the aperture angle α2, i.e. 90° in this case.

The inlet portion 20.1 of the female V 20 thus performs a dynamic guidance function on the male V 19 during the docking stage, while the end portion 20.2 of the female V 20 serves essentially to perform the function of positioning the male V 19 during active positioning by means of the jaws 24.

It should be observed that the male V 19 has two opposite transverse parallel faces 27 and that the female V has two transverse parallel faces 28 facing each other on either side of the slot 22. When the Vs are mounted on the corresponding tools, the faces 27 and 28 are perpendicular to the Z direction such that when the male V 19 is pressed against the female V 20 the faces 28 bracket the faces 27 so as to prevent the male and female Vs from moving relative to each other in the Z direction. This serves to provide relative positioning of the tools in the Z direction.

Naturally, the invention is not limited to the embodiment described and various embodiments can be provided without going beyond the ambit of the invention as defined by the claims.

In particular, the position-holding means can include additional male and female Vs for providing relative positioning of the tools in the Z direction, or the male and females Vs can have conical portions.

In addition, different aperture angles can be used for the Vs, such angles being determined in particular as a function of the magnitude of the docking angle.

It is also possible to provide for the transverse tool of the assembly apparatus not to co-operate with any bodywork element and to perform solely the function of spacing and bracing the side tools.

Finally, the position-holding means of the invention is not limited to the application described relating to the assembly apparatus, and can be employed for holding in position any type of piece that is being handled, in particular pieces that are handled by robots in order to be moved towards each other along two extreme docking directions.

What is claimed is:

1. A device comprising a means for holding two pieces in position that are to be moved towards each other along at least two extreme coplanar docking directions (D1, D2) that form a docking angle (p) between said directions, the position-holding means comprising firstly at least a male and a female V (19, 20) each provided with means for fixing to a respective one of the pieces so that each said V is centered substantially on a direction parallel to the bisector of the docking angle, the female V possessing an inlet portion (20.1) having an aperture angle (α1, a) not less than the docking angle, and secondly means (23, 24) for pressing the male V against the female V along said bisector.

2. The device according to claim 1, wherein the Vs (19, 20) have aperture angles (α) that are substantially equal and greater than the docking angle (β).

3. The device according to claim 2, wherein for a docking angle (β) of about 90°, the aperture angles (α) of the Vs (19, 20) are equal to about 120°.

4. The device according to claim 1, wherein the female V (20) possesses an end portion (20.2) having an aperture angle (α2) substantially equal to the aperture angle of the male V (19) which is not less than the docking angle (β), and wherein the aperture angle (α1) of the inlet portion (20.1) of the female V is greater than the aperture angle (α2) of the end portion (20.2) thereof.

5. The device according to claim 4, wherein, for a docking angle (β) substantially equal to 90°, the aperture angle (α2) of the male V and of the end portion (20.2) of the female V (20) is substantially equal to 90°, and the aperture angle (α1) of the inlet portion (20.1) of the female V (20) is substantially equal to 120°.

6. The device according to claim 1, wherein the position-holding means for pressing the Vs together comprise a peg (23) projecting from the male V (19) symmetrically relative thereto so as to be inserted into an elongate slot (22) formed in the female V (20) and having a major axis contained in the plane of the docking direction, at least one jaw (24) being movably mounted on the peg (23) to be actuated between an active position in which it forms an abutment for a rear face (26) of the female V facing away from the male V, and an inactive position in which it is retracted and allows the peg to pass freely through the slot of the female V.

7. Apparatus for assembling bodywork, the apparatus comprising two side tools (14) supporting body sides (2) and a tool (11) extending transversely relative to the two side tools, comprising means (18) for holding the side tools and the transverse tool in position that are to be moved towards each other along at least two extreme coplanar docking directions (D1, D2) that form a docking angle (β) between said directions, the position-holding means comprising firstly male and female Vs (19, 20) each provided with means for fixing to a respective one of the tools so that each said V is centered substantially on a direction parallel to the bisector of the docking angle, the female V possessing an inlet portion (20.1) having an aperture angle ($\alpha 1$, $\alpha$) not less than the docking angle, and secondly means (23, 24) for pressing the male V against the female V along said bisector, the transverse tool having at least two Vs (19) disposed symmetrically about a longitudinal axis of the bodywork and designed to cooperate with corresponding Vs (20) fixed to the side tools.

8. Apparatus according to claim 7, wherein for a docking angle ($\beta$) of about 90°, the aperture angles ($\alpha$) of the Vs (19, 20) are equal to about 120°, and wherein the bisector (b) of the aperture angles ($\alpha$) of the Vs (19, 20) forms an angle of about 45° with the longitudinal axis of the bodywork.

9. Apparatus according to claim 7, wherein the Vs secured to the transverse tool (11) are male Vs (19) and the Vs secured to the side tools (14) are female Vs (20).

10. Apparatus according to claim 7, wherein, for a docking angle ($\alpha$) substantially equal to 90°, the aperture angle ($\alpha 2$) of the male V and of the end portion (20.2) of the female V (20) is substantially equal to 90°, and the aperture angle ($\alpha 1$) of the inlet portion (20.1) of the female V (20) is substantially equal to 120°, and wherein the bisector (b) of the aperture angles ($\alpha$) of the Vs (19, 20) forms an angle of about 45° with the longitudinal axis of the bodywork.

* * * * *